June 6, 1961 W. C. RUDD 2,986,811
APPARATUS AND METHODS FOR BRAZING
Filed Feb. 23, 1954 2 Sheets-Sheet 1
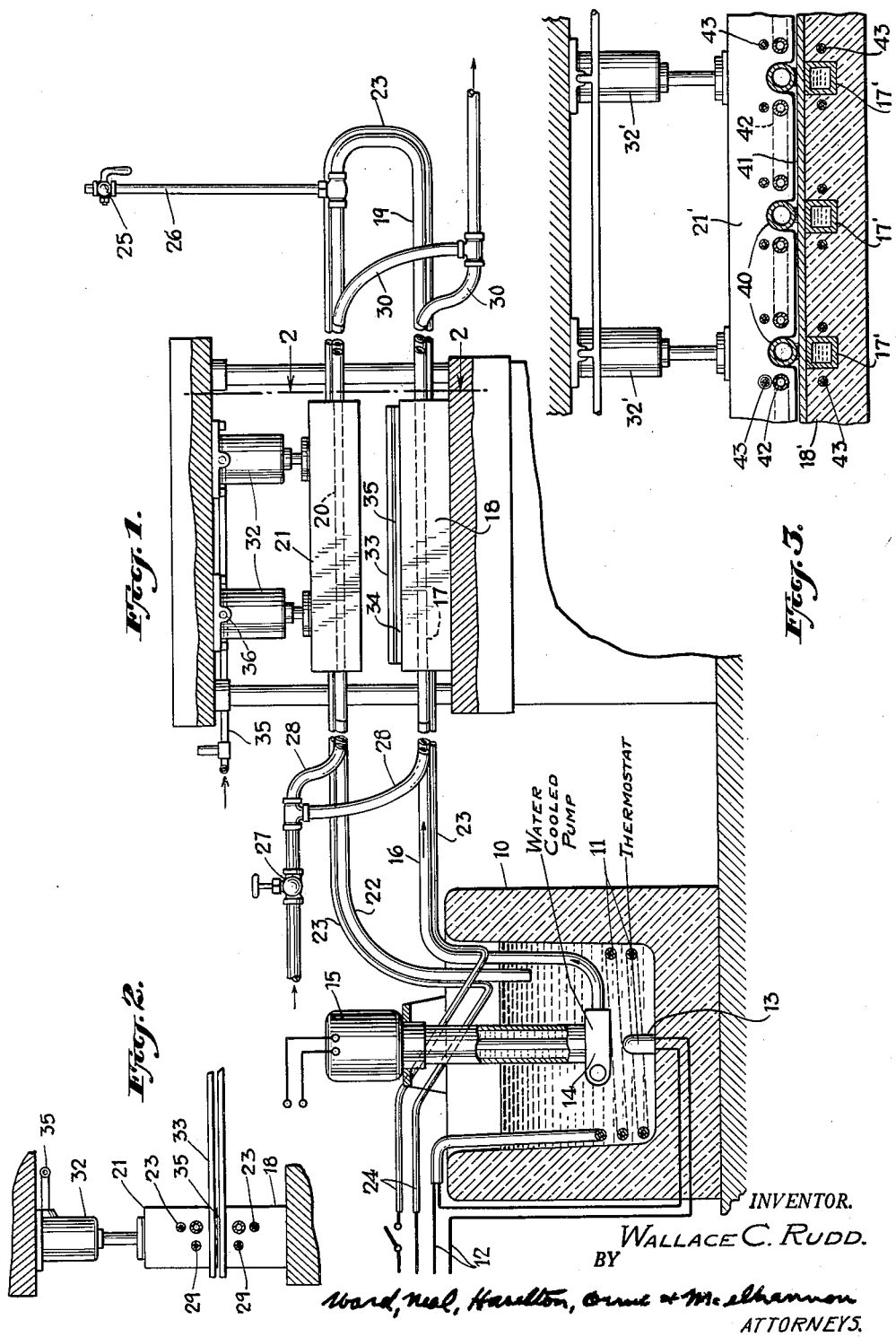
INVENTOR.
WALLACE C. RUDD.
BY
Ward, Neal, Haselton, Orme & McElhannon
ATTORNEYS.

June 6, 1961  W. C. RUDD  2,986,811
APPARATUS AND METHODS FOR BRAZING
Filed Feb. 23, 1954  2 Sheets-Sheet 2
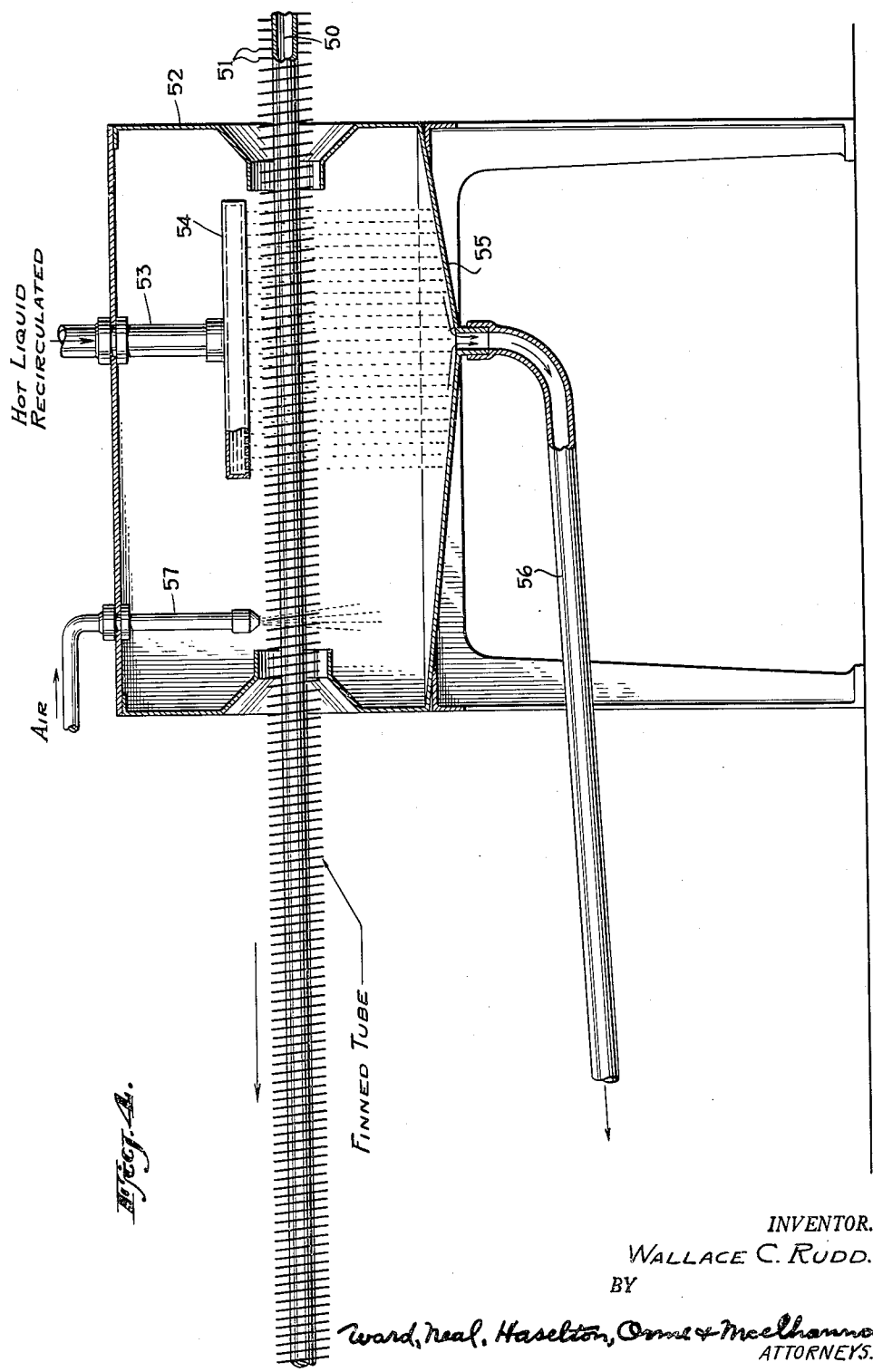
INVENTOR.
WALLACE C. RUDD.
BY
Ward, Neal, Haselton, Orme & MacElhannon
ATTORNEYS.

United States Patent Office 2,986,811
Patented June 6, 1961

2,986,811
APPARATUS AND METHODS FOR BRAZING
Wallace C. Rudd, Larchmont, N.Y., assignor to Magnetic Heating Corp., New Rochelle, N.Y., a corporation of New York
Filed Feb. 23, 1954, Ser. No. 411,605
10 Claims. (Cl. 29—487)

This invention relates to methods and means for securing metal parts together by brazing or soldering, among other possible uses.

In the brazing of metal members formed of aluminum or other metals having a relatively low melting point, it is often necessary in practice to use a brazing metal which will have a melting point somewhat below, but so close to that of the metal members, that the satisfactory melting of the brazing metal without danger of melting or injuring the members to be brazed together presents a serious problem. Aluminum for example melts at a temperature of about 1215° F. and since the conventional types of brazing metal commonly used for brazing aluminum melt at about 1100° F., it will be apparent that the supplying of sufficient heat to the brazing metal satisfactorily to melt the same without melting or endangering any portion of the aluminum parts, presents the problem of quickly subjecting the assembly to a temperature just above 1100° F. but without at any time raising the temperature of any portion of the aluminum parts to a point above about 1200° F. If a blow torch or any other ordinary form of flame is used for the purpose, it is apparent that the aluminum parts would be endangered before the brazing area is uniformly heated to the necessary degree. While various other methods have been attempted for solving this problem, the usual method available heretofore has been to place the assembly which is desired to be brazed in a furnace, with carefully regulated temperature. But the initial expense and maintenance cost of such furnaces, as well as the time required for the brazing operation is excessive.

Efforts have also been made to solve the problem by subjecting the brazing areas to heat derived from a hot stream of steam, air or other gas. However, in order to quickly apply in this way sufficient heat for the purpose, I have found that it would be necessary to supply the stream of steam or gas at such an extremely high velocity and pressure as to render this method quite uneconomical and impractical in most cases. On the other hand, I have found in accordance with the present invention, that if a stream of a suitable liquid or molten material having a high specific heat is used and is continuously circulated at the brazing area to and from a body of the hot liquid or molten material which is kept at the desired predetermined temperature, then in this way a large reservoir of heat at the required closely regulated temperature level is made available so that such a hot stream may be conveniently and economically used to perform such brazing operations in a matter of a few seconds.

In accordance with the present invention the stream of hot liquid or molten material is preferably conducted through suitable passages contained in clamps, or the like, which are used to clamp the parts together during the brazing operation. However, in some cases the hot stream may be allowed to flow directly over and in contact with the parts to be brazed, for example, while such parts are being progressively advanced. In either case, means are preferably provided for promptly cooling the brazed areas just after the brazing is accomplished, thereby to solidify the braze against disruption when the clamping means is removed, or when the assembly is moved away from the brazing zone. This cooling of the members need only lower their temperature by a few degrees in view of the close proximity of the brazing temperature and the temperature at which the brazing metal will solidify, and further I have found that such cooling may readily be carried out at or adjacent the brazing region without interrupting the hot stream and merely by passing cooling fluid momentarily through the clamping means used or by projecting cooling fluid directly onto the brazed parts.

In case one or more of the parts to be brazed together comprise tubing, then the hot stream may be passed directly through such tubing, although preferably in this case the stream is passed through passages in the clamping means while the cavity in the tubing may be used to conduct the momentary cooling stream therethrough, for example, a stream of water.

In any case the temperature of the hot liquid or molten stream is regulated or adjusted to a point just above the melting point of the brazing metal, or just above the softening point of the surfaces to be brazed together, but still below the point at which the parts which are to be brazed together will become melted enough to be injured or distorted. In this way sufficient heat may quickly be applied to the areas to be brazed with no possibility that any part of the assembly can be heated to a temperature high enough to injure the members which are to be brazed together, regardless of the length of time during which the parts may remain in the proximity of the hot stream.

In other words, the temperature of the hot stream of liquid or molten metal which may be easily regulated, makes possible the supplying of the necessary brazing heat at a positive and definite predetermined temperature, so that no metal parts in the vicinity of the hot stream can be heated to a temperature too high, and all parts along adjacent the stream will be heated to substantially the same predetermined regulated temperature. Because the stream is recirculated and its temperature regulated, and because it has a high specific heat, adequate and ample amounts of heat can be transferred thereby, which amounts are a function of the velocity of the stream, and hence the return flow of the circulating stream need not be at a substantially lower temperature than the outgoing or supply flow.

Various further and more specific objects, features, advantages and uses of the invention will appear from the following description taken in connection with the accompanying drawings which illustrate, by way of example, cerain presently preferred forms of the invention.

In the drawings:

FIG. 1 is a somewhat diagrammatic view illustrating a preferred form of equipment or apparatus for carrying out one embodiment of the invention;

FIG. 2 is a sectional view taken substantially along line 2—2 of FIG. 1;

FIG. 3 is a view partly in vertical section showing portions of an alternative form of apparatus for carrying out the invention, and FIG. 4 is a somewhat diagrammatic view of portions of another embodiment of apparatus for carrying out the invention in cases such as, for example, where radiating fin means is to be brazed to heat exchange tubing.

Referring now to FIG. 1 in further detail, a receptacle is indicated at 10 for containing a body of the hot liquid or molten material, a suitable electrical resistance heater as at 11 being provided for maintaining the liquid at the desired temperature or for maintaining the material in the receptacle in molten condition. The current connections 12 for this heater may, as shown, include in series therewith a suitable thermostat 13 of known construction located within or adjacent the hot liquid and acting to shut off the current whenever the liquid temperature tends to exceed the desired predetermined level.

A suitable pump as at 14 is located in the body of liquid or molten material and is driven by a motor 15 continuously in a direction to force a hot stream through a conduit 16, thence through a passage 17 in a lower clamping member 18, then through a conduit 19 back through a passage 20 in an upper clamping member 21 and finally back through a conduit 22 which discharges into the receptacle 10.

In order to heat the passages for the hot stream to a temperature which will prevent solidification of the stream in the passages when the apparatus is first being started, all of the above described conduits and passages are preferably accompanied by an electrical resistance heating means of a suitable known type as indicated at 23, having connections 24 to a suitable source of current. Such heating means may also be used to maintain the hot stream in liquid or molten condition at times when the circulation thereof may be stopped for any reason.

Ordinarily, when the motor and pump are stopped, it will be advisable to allow the hot stream to drain out of the circulating path and this will readily occur upon opening a valve 25 located at the upper end of a pipe 26 which communicates with an upper point in conduit 19 and allows air to enter to replace the liquid.

For momentarily cooling the clamps 18 and 21 to a limited degree for the purposes above explained, a stream of cooling fluid, for example water, may be introduced through a valve 27 and pipes 28, which communicate with additional passages 29 in the clamping elements (FIG. 2), such passages being connected to discharge the cooling fluid to waste through pipes as at 30.

The upper clamping means 21 may be supported from suitable fluid pressure-operated cylinder and piston devices as at 32 for moving this clamping means either up or down into clamping relationship to the work pieces as at 33, 34 which rest upon the clamping means 18 and between which may be interposed a strip of brazing metal as at 35. The fluid pressure actuated cylinders 32 may be controlled in any desired well known way by fluid admitted and discharged through inlet and outlet pipes 35, 36.

The tube portions 19 and 22 may be made relatively long and with sufficient flexibility to readily accommodate the vertical movement of the clamping means 21.

The hot liquid or molten material to be used for temperature ranges suitable for aluminum brazing for example, that is from about 1100° to 1150° F., may comprise various combinations of salts, such as potassium nitrate, sodium nitrate, sodium hydroxide, or lead and alloys thereof. For example, a salt mixture commercially known as T1 salt may be used, a product of Crown Chemical Co. For lower temperature work, such as various soft soldering operations, normally liquid materials such as are well known for heat transfer purposes may be used, for example, a well known product put out commercially by the Dow Chemical Company under the trademark "Dowtherm." When any of these materials are used the pump as well as the tubes and changing means may preferably be formed of stainless steel, the pump being water cooled if the temperature required is relatively high.

In operating the apparatus of FIG. 1 for the purpose for example, of brazing two sheets of aluminum 33, 34 together between their edges, such sheets may be placed in superimposed relation as indicated in FIGS. 1 and 2 with a ribbon of a suitable known aluminum brazing metal 35 interposed therebetween. The body of molten material in the receptacle 10 will have been previously brought up to a temperature of about 1100 to 1150° F. as regulated by the thermostat 13 and, if necessary, the circulating path will have been temporarily preheated by the heating means 23 before starting the motor and circulation of the hot stream. As soon as the clamping means 18, 21 have become heated to the desired brazing temperature the clamping means 21 is lowered by the cylinders 32 to engage and clamp the aluminum sheet assembly in position as shown in FIG. 2. Since the circulating hot stream will maintain a large thermal storage in the clamping elements because of the high specific heat of the liquid or molten material, the necessary brazing temperature will be quickly applied to the desired brazing area, so that two sheets aluminum, for example of 0.05" thickness, may be brazed together in about 21 seconds. If no further step were taken to cool the brazed parts the brazing metal would then of course remain substantially in a molten state. In that case, the assembly could be removed if desired and if clamps were provided to hold the sheets clamped together after removal and until the brazing metal cools. However, the use of such additional clamping means may, according to the invention be conveniently avoided by slightly chilling the clamping members 18 and 21 by momentarily passing water therethrough by way of connections 27, 28 and 30 in the water flowing through passages 29 (FIG. 2) which are closely adjacent to the work and close to the hot stream channels. Such cooling water need only be used for a moment sufficient to slightly lower the clamp temperature which will cause the brazing metal to solidify, whereupon the clamping element 21 may be raised and the brazed assembly removed. During this operation the hot stream need not be interrupted and although the chilling action of the water stream may possibly solidify a small amount of the hot liquid, yet, as soon as the chilling fluid is stopped from flowing, the solidified material will be re-melted. The hot stream through the clamping means may be made large enough so that the chilling action does not cause blocking of the stream entirely.

It will be apparent that the apparatus in FIG. 1 may be continuously used to braze a series of assemblies in rapid succession. Then when it is desired to shut down the equipment, the pump is stopped and the hot liquid is allowed to drain from the circulating path by opening the valve 25 to admit air.

In case it is desired to braze a length of tubing of any shape such as a serpentine shape to a plate or other object, clamping means may be provided as shown in FIG. 3. Here the lower clamping means 18' may be of insulation material containing a tube 17' shaped to follow the same serpentine path as the tube 40 which is to be brazed to a plate of aluminum 41. The upper clamping means 21' is formed on its lower surface with a channel suitably shaped to receive tubing 40 and also containing a passage as at 42 therein for conducting the hot stream, viz., for the same purpose as passage 20 in FIG. 1. Instead of using a separate cooling fluid passage, if desired the cooling fluid may be passed directly through the tubing 40 although this will involve taking the time to couple and uncouple the source of cooling fluid to each length of tubing which is to be brazed. Or, alternatively, if desired the hot liquid may be passed directly through the tubing 40 and the cooling fluid through the passage 42. The upper clamping means 21' may be raised and lowered by fluid pressure cylinders 32'. Both the upper and lower clamping means 18' and 21' may contain resistance heating means as at 43, corresponding in function to the resistance heating means 23 in FIG. 2. In other respects the operation of the arrangement of FIG. 3 (in conjunction with the reservoir 10, pump 14 and motor) may be the same as above explained in connection with FIGS. 1 and 2.

FIG. 4 shows an alternative form of apparatus with which the invention in certain of its phases may be utilized for the purpose of welding parts onto a continuously moving assembly. For example, here is shown a heat exchange tube 50 formed of aluminum for example, onto which there has just been wound a helical radiating fin means as at 51. Suitable means are provided to continually advance this assembly from the point where it is produced into and through a chamber 52. In this chamber a stream of hot liquid or molten material is admitted through a pipe 53 and distributed through suitable nozzle means 54 onto the fin tube assembly from which the liquid falls onto a floor area 55 and is conducted away through a tube 56. It will be understood that the tube 53 is to be supplied with a hot stream from pump reservoir means, the same as in FIG. 1 and the stream after passing over the assembly to be brazed is conducted by tube 56 back to the reservoir in which the liquid is maintained at the desired constantly regulated temperature.

The fin material 51 as well as the tube 50 may be formed of silicon-containing aluminum of a known type which when its surface is raised to an appropriate temperature will readily braze to another like surface without the necessity of interposing any other brazing material. Thus, as the assembly passes through the hot streams beneath the nozzle means 54, it will be quickly raised to an appropriate temperature for brazing the inner edges of the fin convolutions to the outer surface of the tube. Then just after the assembly has passed through the hot streams, it is subjected to an air stream from a nozzle 57 which will cause the excess hot liquid to be blown from the assembly and at the same time cool the assembly to a degree such that the weld between the fins and the tubing will become firm.

The term "brazing" as used herein and in the appended claims, is intended to apply to operations of a similar nature such as often referred to as soldering. The invention is particularly well adapted for certain so-called "soft soldering" operations wherever the required temperature limitations are fairly critical and where for instance the metal members to be soldered together are closely associated or connected to plastic or combustible parts which would be injured by any excessive temperature. Also the term "regulated temperature" is intended to apply not only to cases where the temperature of the liquid is being constantly regulated as by some well known automatic means, but also in cases where the source of supply of the heated fluid may be so set up and adjusted initially that it will continue to supply the fluid at approximately the desired predetermined temperature. The term "hot liquid" as used in the appended claims is also intended to have reference to hot molten materials.

This application comprises a continuation-in-part of application Serial No. 329,798, filed January 1, 1953, entitled Methods and Apparatus for Brazing, now abandoned.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for brazing together an assembly of metal members at a brazing temperature below but close to a temperature which will injure at least one of the members, which method comprises: heating the assembly to brazing temperature by causing a stream of hot molten liquid of high specific heat to flow through a confined channel in means in direct heat exchange relationship with the assembly, while maintaining such stream at said brazing temperature by circulating same to and from a body of the hot molten liquid which is maintained substantially at said temperature; and while maintaining said stream, also bringing a separate stream of cooling fluid into heat transfer relationship to the assembly for chilling and thereby solidifying the brazed surfaces, and maintaining said hot molten liquid and cooling fluid streams isolated one from the other while in heat transfer relationship with the assembly.

2. Method for brazing together an assembly of metal members at a brazing temperature below but close to a temperature which will injure at least one of the members, which method comprises: clamping the assembly by heat transfer means containing a stream of hot molten liquid of high specific heat for heating the assembly to said brazing temperature, while maintaining such stream substantially at said brazing temperature by circulating same to and from a body of the hot molten liquid which is also maintained substantially at said temperature; and then bringing a stream of cooling fluid into heat transfer relationship to the assembly momentarily for chilling and thereby solidifying the brazed surfaces before unclamping the assembly.

3. Method for brazing together an assembly of metal members at a brazing temperature below but close to a temperature which will injure at least one of the members, which method comprises: clamping the assembly by means in direct heat transfer relation with the assembly containing a stream of hot molten liquid of high specific heat for heating the assembly to said brazing temperature, while maintaining such stream substantially at said brazing temperature by circulating same to and from a body of the hot liquid.

4. Method for brazing together an assembly of metal members at a brazing temperature below but close to a temperature which will injure at least one of the members, which method comprises: clamping the assembly by means containing a stream of hot molten liquid of high specific heat for heating the assembly to said brazing temperature, while maintaining such stream substantially at said brazing temperature by circulating same to and from a body of the hot liquid; and then passing a stream of cooling fluid through the clamping means for chilling the assembly and thereby solidifying the brazed surfaces before unclamping the assembly.

5. Method for brazing a metal tube to another metal member, which method comprises: placing the tube and such other member together and with brazing metal along the desired line of brazing, heating such other member to the required brazing temperature by applying along such line but on a surface thereof opposite from such metal tube, another tube, and passing through such other tube a stream of the hot molten liquid, also heating said metal tube to such temperature by passing said hot molten liquid therethrough and circulating same to and from a body of said hot molten liquid maintained at said temperature.

6. Apparatus for brazing together assemblies of metal members at a brazing temperature close to but below the temperature which will injure same, which apparatus comprises: a receptacle with heating means for maintaining a body of molten liquid of high specific heat therein at a predetermined temperature approximating said brazing temperature; means for holding an assembly of the metal members during the brazing operation and having at least one passage for conducting liquid therethrough; and pump means for continuously circulating a stream of said hot liquid to and from said body of liquid through said passage.

7. Apparatus for brazing together assemblies of metal members at a brazing temperature close to but below the temperature which will injure same, which apparatus comprises: a receptacle with heating means for maintaining a body of molten liquid of high specific heat therein at a predetermined temperature approximating said brazing temperature; clamping means for holding an assembly of the metal members during the brazing operation and having passages for conducting liquid therethrough; pump means for continuously circulating a stream of said hot liquid to and from said body of liquid through said passages; and means for supplying cooling fluid through another of said passages for chilling the brazed surfaces.

8. Apparatus for brazing together assemblies of metal members at a brazing temperature close to but below the temperature which will injure same, which apparatus comprises: a receptacle with heating means for maintaining a body of molten liquid of high specific heat therein at a predetermined temperature approximating said brazing temperature; clamping means for holding an assembly of the metal members during the brazing operation and having passages for conducting liquid therethrough; pump means for continuously circulating a stream of said hot liquid to and from said body of liquid through said passages; and electrical resistance heating means extending along the path of the circulating stream.

9. Apparatus for brazing metal tubing having a predetermined curvature to a metal plate, comprising: a support of heat insulating material on which the plate is adapted to rest during the brazing operation and with the tubing in turn resting on the plate; a length of metal tubing embedded in such support and having a flat wall surface adapted to contact the underside of the plate and along the line of said curvature; means above the support for pressing the tubing which is to be brazed to the plate down against the plate; means for maintaining a supply of hot molten fluid under pressure and at regulated temperature; conduit means with detachable connections for conducting such fluid through said tubing which is embedded in the support and also along said tubing which is to be brazed to the plate, and pump means for continuously circulating the hot molten fluid from the supply means to and through said tubings and back to said supply.

10. Method for brazing together metal members by the use of brazing metal having a melting temperature below that of the members but close to that of at least one of the members, which method comprises: heating at least one of the members in contact with the brazing metal at the desired region of brazing by causing a stream of hot molten liquid to flow through a confined channel in means in direct heat exchange relationship with said member, while regulating the temperature of such stream to a degree which is high enough to melt the brazing metal but too low to cause melting of said member.

References Cited in the file of this patent

UNITED STATES PATENTS

| | | |
|---|---|---|
| 1,516,596 | Gammeter | Nov. 25, 1924 |
| 2,154,273 | Kollsman | Apr. 11, 1939 |
| 2,178,671 | Osborn | Nov. 7, 1939 |
| 2,239,796 | Stratton | Apr. 29, 1941 |
| 2,268,369 | Askin | Dec. 30, 1941 |
| 2,317,457 | Heller | Apr. 27, 1943 |
| 2,332,368 | Burtenshaw | Oct. 19, 1943 |
| 2,348,232 | Trautman et al. | May 9, 1944 |
| 2,352,325 | Hughey | June 27, 1944 |
| 2,385,388 | Thoresen | Sept. 25, 1945 |
| 2,424,919 | Bosomworth | July 29, 1947 |
| 2,469,392 | Jones et al. | May 10, 1949 |
| 2,521,847 | Harr | Sept. 12, 1950 |
| 2,588,500 | Dugan | Mar. 11, 1952 |
| 2,598,966 | Becker | June 3, 1952 |
| 2,621,704 | Langer | Dec. 16, 1952 |
| 2,632,088 | Meyrick et al. | Mar. 17, 1953 |
| 2,650,420 | True | Sept. 1, 1953 |
| 2,693,636 | Simpelaar | Nov. 9, 1954 |
| 2,716,276 | Brown | Aug. 30, 1955 |

OTHER REFERENCES

Materials and Methods Manual 75, Materials and Methods, October 1951, pages 115–130.